United States Patent [19]

Tsunoda et al.

[11] 4,389,537
[45] Jun. 21, 1983

[54] VOICE WARNING SYSTEM FOR AN AUTOMOTIVE VEHICLE PROVIDED WITH AN AUTOMATIC SPEED CONTROL DEVICE

[75] Inventors: Masakazu Tsunoda, Fujisawa; Kazuyuki Mori, Yokohama, both of Japan

[73] Assignee: Nissan Motor Company, Limited, Kanagawa, Japan

[21] Appl. No.: 193,814

[22] Filed: Oct. 3, 1980

[30] Foreign Application Priority Data

Oct. 4, 1979 [JP]  Japan ............................... 54-127357

[51] Int. Cl.³ .............................................. G10L 1/00
[52] U.S. Cl. .............................. 179/1 SM; 179/1 VL; 179/1 VE
[58] Field of Search .............. 179/1 SM, 1 VE, 1 SG, 179/1 VL; 340/147, 148, 62, 53, 52 R; 455/221

[56] References Cited

U.S. PATENT DOCUMENTS

| | | | |
|---|---|---|---|
| 3,599,052 | 8/1971 | Carp et al. | 317/148.5 |
| 3,641,496 | 2/1972 | Slavin | 179/1 SM |
| 3,823,383 | 7/1974 | Mallinger | 340/62 |
| 3,859,629 | 1/1975 | Komiyama et al. | 179/1 VE X |
| 3,870,818 | 3/1975 | Barton | 179/1 SM |
| 3,949,359 | 4/1976 | Sorkin | 340/54 |
| 4,136,331 | 1/1979 | Cullen | 340/53 |

FOREIGN PATENT DOCUMENTS

| | | |
|---|---|---|
| 453235 | 9/1936 | United Kingdom . |
| 1014216 | 12/1965 | United Kingdom . |
| 1137648 | 12/1968 | United Kingdom . |
| 1189321 | 4/1970 | United Kingdom . |
| 1445597 | 8/1976 | United Kingdom . |
| 1449776 | 9/1976 | United Kingdom . |
| 1460148 | 12/1976 | United Kingdom . |
| 1490787 | 11/1977 | United Kingdom . |
| 1535488 | 12/1978 | United Kingdom . |
| 1544736 | 4/1979 | United Kingdom . |

Primary Examiner—Emanuel S. Kemeny
Attorney, Agent, or Firm—Lowe, King, Price & Becker

[57] ABSTRACT

A voice warning system for an automobile vehicle provided with an automatic speed control device, by which the driver is informed of the vehicle speed, in voice form, when operating a set switch for controlling the vehicle with the device. The volume level of the voice form signal is determined in accordance with a volume setting of a radio in the vehicle. The voice warning system comprises a vehicle speed sensor, a component for generating a signal representative of the volume of the radio, an interface, a voice synthesizing system, and an electronic volume control for the synthesized message, in addition to the automatic speed control device and a set switch therefor.

6 Claims, 3 Drawing Figures

4,389,537

VOICE WARNING SYSTEM FOR AN AUTOMOTIVE VEHICLE PROVIDED WITH AN AUTOMATIC SPEED CONTROL DEVICE

BACKGROUND OF THE INVENTION

1. Field of the Invention

The present invention relates generally to a voice warning system for an automotive vehicle provided with an automatic speed control device, and more particularly to a voice warning system which informs the driver of the vehicle speed, in voice form, when the vehicle is set to travel at a desired set speed under control of the automatic speed control device.

2. Description of the Prior Art

There has been used an automotive vehicle in which an automatic speed control device (hereinafter referred to as simply ASCD) is provided to keep the vehicle speed automatically at a desired set speed within a vehicle speed range of for example 60 to 100 km/h.

With the ASCD, the driver can set the vehicle to travel at a desired vehicle speed by operating a switch provided on top of a lever mounted on the steering column, whenever the car is traveling at a speed from 60 to 100 km/h, and the vehicle will then travel at the set speed without the driver operating the accelerator pedal.

In such devices, however, the driver must look at the speedometer in order to know the speed at which the vehicle is actually traveling, and it may sometimes be troublesome for the driver to check the speed on the speedometer.

BRIEF SUMMARY OF THE INVENTION

With these problems in mind, therefore, it is the primary object of the present invention to provide a voice warning system for an automotive vehicle provided with an automatic speed control device, by which the driver is informed of the vehicle speed, in voice form, after having set the vehicle to travel at a constant speed under control of the automatic speed control device.

To achieve the above object, the voice warning system of the present invention comprises a vehicle speed sensor, an interface, and a voice synthesizing system including a memory unit, a voice synthesizer, and a control unit, in addition to an automatic speed control device.

BRIEF DESCRIPTION OF THE DRAWINGS

The features and advantage of the voice warning system of the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
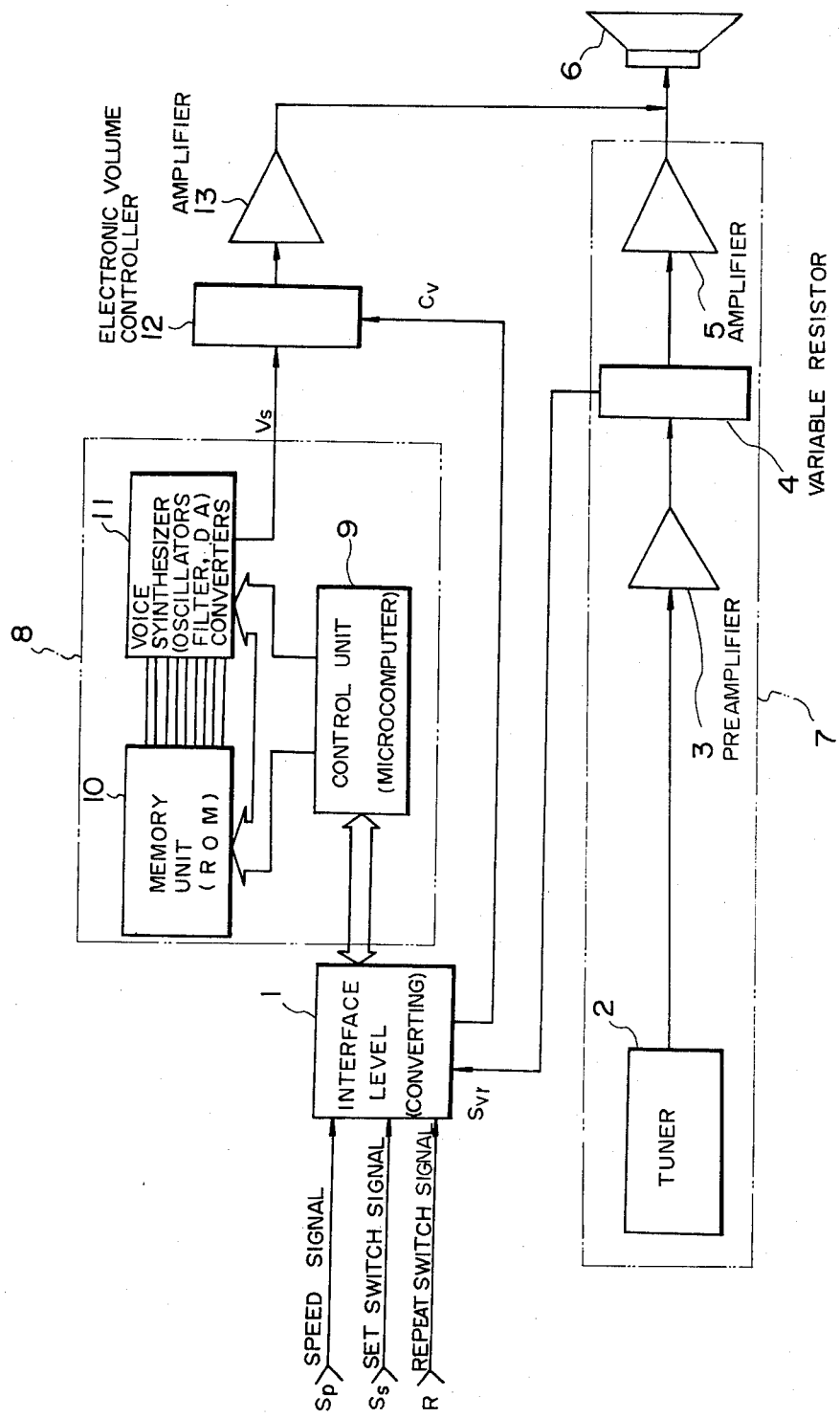
FIG. 1 is a schematic block diagram of an embodiment of the present invention.

Reference is now made to the figures, and more specifically to FIG. 1, wherein a preferred embodiment of the present invention is illustrated.

In FIG. 1, the numeral 1 denotes an interface including a waveform shaper, a multiplexer and so on, to which are input various signals such as a vehicle speed signal $S_p$ with a frequency corresponding to the vehicle speed detected by a speed sensor 20, an on/off signal $S_s$ from a set switch 21 provided for the ASCD, an on/off signal R from a repeat switch 22, and a sound volume signal $S_{VR}$ indicating a sound volume value as set by a volume control 4 (variable resistor) provided in a car radio 7. In this case, the car radio 7 comprises a tuner 2, a preamplifier 3, a volume control 4, an amplifier 5, and a speaker 6.

The vehicle speed signal $S_p$ is shaped to a rectangular pulse signal through the waveform shaper in the interface 1, and other signals $S_s$, R, and $S_{VR}$ are also converted to digital signals through the waveform shaper so as to be suitable for input to a microcomputer provided in a control unit 9 of the voice synthesizing system 8 explained below.

The numeral 8 denotes a voice synthesizing system of a linear prediction coding (LPC) type including three LSI units: a memory unit (ROM) 10, a voice synthesizer unit 11 (oscillators, filters, and D-A converters), and a control unit (microcomputer) 9. This control unit 9 is a microcomputer comprising a CPU for controlling all the operations, a memory (ROM) for storing programs and fixed data, a memory (RAM) for storing input/output data, a clock oscillator and so on, by which the above-mentioned signals input through the interface 1 are processed in accordance with a program explained later, and various voiced messages are synthesized to inform the driver of the vehicle speed, using time sharing.

Figure 2:
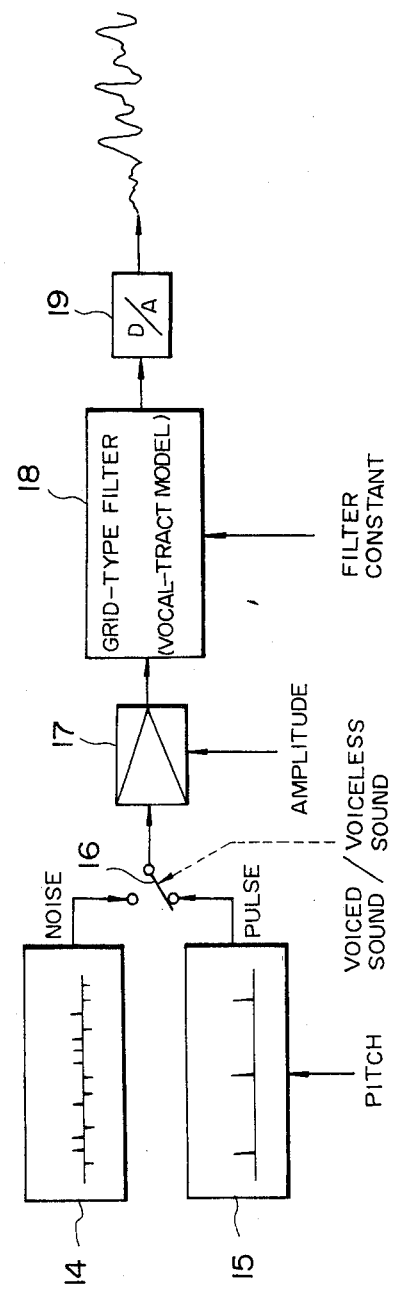
FIG. 2 is a schematic block diagram of assistance in explaining the theory of operation of a voice synthesizer using a linear prediction coding system (LPC)

As is well known in the art, a voice synthesizer based on a LPC system has recently been put on the market at a reasonable price by Texas Instruments Incorporated of the USA. FIG. 2 shows schematically the principle of this voice synthesizer.

In this synthesizer, pseudo-random noise signals generated from a first sound source oscillator (white noise generator) 14 are selected by a switch 16 in the case of voiceless sounds; periodic impulse signals generated from a second sound source oscillator (impulse generator) 15 are selected by the switch 16 in the case of voiced sounds. After being amplified by an amplifier 17, the noise and pulse signals are formed into a voice sound by a grid-type filter 18 where the resonance characteristics of a human vocal tract (vocal organs such as tongue and lips located above the vocal chords) in speaking are modeled, and are output as a synthesized voice signal after conversion to an analog signal through a D-A converter 19.

The different values of constants such as the pitch of the periodic impulse signal, the difference between voiced sound and voiceless sound, the amplification ratio of the amplifier 17, and the filter constant of the grid-type filter 18, and so on are stored in the memory unit (ROM) 10 of FIG. 1.

The synthesizer 11 comprises various circuits which correspond to the first sound source oscillator 14, second sound source oscillator 15, switch 16, amplifier 17, grid-type filter 18, and D-A converter 19 so that the synthesized voice sound signal $V_s$ necessary for the warning message can be output after being controlled according to the output signal selected by the control unit 9.

Thus, the necessary synthesized voice signal $V_s$ is output from the voice synthesizer 11, according to the vehicle speed detected by the speed sensor, under control of the signal from the control unit 9. The signal $V_s$ is next adjusted by an electronic volume control 12 of a voltage control type, amplified by an amplifier 13, and output through the speaker 6 of the car radio 7.

Further, in this case, the microcomputer in the control unit 9 determines the voice volume according to a car-radio sound volume as adjusted by driver preference (determined by the signal $S_{VR}$ from the variable resistor 4 of the car radio 7) and outputs a voice volume control signal $C_v$ to the electronic volume control 12 through the interface 1.

Figure 3:
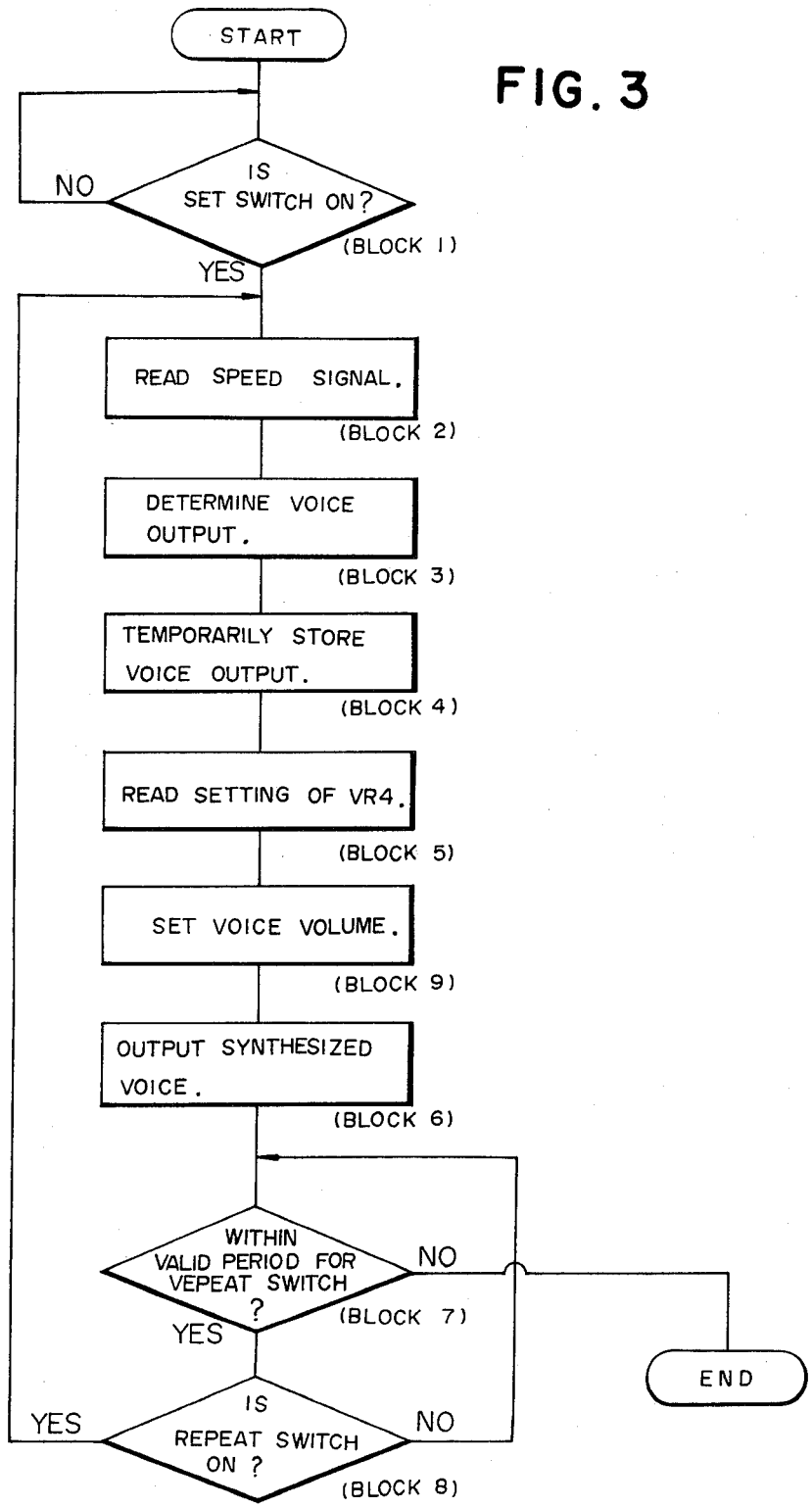
FIG. 3 is an example flowchart of a program used with the embodiment of FIG. 1.

FIG. 3 shows an example of a flowchart used with the microcomputer in the control unit 9.

In this flowchart, first the program determines whether or not the ASCD set switch is on (block 1). If off, the system stands by; if on, the program proceeds. It is possible to design the microcomputer so as to execute another program for controlling processes other than for the present invention while the set switch is off.

When the set switch is on, the multiplexer in the interface 1 reads a vehicle speed signal $S_p$ through the speed sensor (block 2) and counts pulses of the signal with a frequency corresponding to the vehicle speed for a given period of time, so that information pertaining to the vehicle speed for the ASCD is obtained.

Next, in accordance with the vehicle speed information, a voice form message is determined such as, for example, "Set speed is now 70 km per hour" (block 3).

This voice output is temporarily stored in the RAM of the microcomputer (block 4). A sound volume value as set by the volume control 4 in the car radio 7 is taken as a signal $S_{VR}$ to determine the voice volume depending on driver preference (block 5), and the electronic volume control 12 is adjusted by the signal $C_v$ sent from the interface 1 (block 9).

Next, the memory unit 10 and the voice synthesizer 11 are controlled in accordance with the voice output stored temporarily in the RAM of the microcomputer; synthesized voice signals $V_s$ are produced and output through the electronic volume control 12, the amplifier 13 and the speaker 6 to inform the driver of the vehicle speed (block 6).

Next, the program checks whether the repeat switch is operable, that is, whether a particular interval (e.g. two minutes) has elapsed. Unless the repeat switch is turned on within this period, the program ends (block 7). If the repeat switch is turned on within this period, the program repeats the steps beginning from block 2 again to repeat the message to the driver in voice form. This repeat switch is useful when the driver fails to hear the voice information.

In addition, in this embodiment, although an LPC type voice synthesizing system has been explained as the device for outputting a voice message concerning the vehicle speed for the ASCD, it is possible to use a synthesizer of another type such as a voice reproducing device using a magnetic recording medium, as will be understood by practitioners in the art.

As described above, according to the present invention, since vehicle speed obtained from the speed sensor is indicated to the driver the voice form when the driver turns on the set switch for an automatic speed control device, the driver can know the accurate vehicle speed, even when the speed changes abruptly, without looking at the speedometer.

It will be understood by those skilled in the art that the foregoing description is in terms of preferred embodiments of the present invention wherein various changes and modifications may be made without departing from the spirit and scope of the invention, which is to be defined by the appended claims.

What is claimed is:

1. A voice warning system for an automotive vehicle provided with an automatic speed control device, which comprises:
   (a) a vehicle speed sensor for detecting vehicle speed and for outputting a vehicle speed signal $S_p$;
   (b) a set switch provided for the automatic speed control device for setting the vehicle to travel at a constant speed under control of the automatic speed control device, and for outputting a set switch signal $S_s$;
   (c) a voice synthesizing system responsive to the vehicle speed and set switch signals for reading the speed signal output by said vehicle speed sensor in response to said set switch signal output by said set switch, and for outputting a voice form output message in accordance with the detected vehicle speed signal;
   (d) an interface for controlling the connections of the vehicle speed signal and the set switch signal to the voice synthesizing system;
   (e) a volume control for a car-radio in the vehicle, said volume control generating a sound volume signal connected to said interface;
   (f) said interface including means for generating a voice volume control signal corresponding to said sound volume signal; and
   (g) an electronic volume control for adjusting the voice volume of the voice form output message in accordance with the voice volume control signal generated by said interface,
   whereby the vehicle speed is indicated to the driver as a voiced message having a volume level according to the car-radio sound volume as adjusted by driver preference, when said set switch is turned on.

2. A voice warning system for an automotive vehicle provided with an automatic speed control device, which comprises:
   (a) a vehicle speed sensor for detecting vehicle speed and outputting a vehicle speed signal $S_p$;
   (b) a set switch provided for the automatic speed control device for setting the vehicle to travel at a constant speed under control of the automatic speed control device and outputting a set switch signal $S_s$;
   (c) an interface including a waveform shaper, said interface being connected to said vehicle speed sensor and to said set switch for waveform-shaping the vehicle speed signal $S_p$ into a rectangular pulse signal;
   (d) a voice synthesizing system including:
      (1) a voice synthesizer;
      (2) a memory unit connected to said voice synthesizer for temporarily storing the voices synthesized by said voice synthesizer; and
      (3) a control unit connected to said interface, to said voice synthesizer and to said memory unit, said control unit formed by a microcomputer having a central processing unit, a read only memory for storing programs and fixed data, a random access memory and a clock oscillator;

said control unit outputting, in response to the signal $S_s$ output by said set switch, a command signal to said interface to read the vehicle speed signal $S_p$ output by said vehicle speed sensor and to count a number represented by a sequence of $S_p$ signals in a given period of time;

said control unit further outputting other command signals to said voice synthesizer to determine a voice form message in accordance with the counted vehicle speed information and to output the determined voice form message after having temporarily stored the message in said memory unit, (e) sound volume signal generating means provided in a car-radio in said vehicle and connected to said interface for outputting a sound volume signal $S_{VR}$ indicative of a car-radio sound volume setting; and (f) an electronic volume controller connected to said voice syntehsizer and to said interface for adjusting voice volume of the determined voice form output message in accordance with a voice volume control signal output by said interface in accordance with said sound volume signal, whereby the vehicle speed is indicated to the driver as a voiced message having a volume level according to the car-radio sound volume setting.

3. A voice warning system as set forth in claim 1, which further comprises a repeat switch, being connected to said interface, for generating a signal causing said voice synthesizing system to repeat the voice message to the driver when said repeat switch is operated.

4. A voice warning system as set forth in claim 2, which further comprises a repeat switch connected to said interface for outputting a repeat switch signal R to said interface, said control unit causing said voice synthesizing system to repeat the determined voice message when said repeat switch provides said repeat signal to said interface.

5. A method of indicating a vehicle speed message, in voice form, to a driver of a vehicle provided with an automatic speed control device, which comprises the steps of:

(a) determining whether or not a set switch provided for the automatic speed control device for setting the vehicle to travel at a constant speed under control of the automatic speed control device is outputting a set switch signal $S_s$;

(b) upon determining that the set switch is outputting a set switch signal, reading vehicle speed signals $S_p$ output by a vehicle speed sensor and counting the number of said vehicle speed signals for a given period of time to obtain vehicle speed;

(c) determining a voice form message output in accordance with the counted vehicle speed;

(d) temporarily storing the determined voice form message in a memory unit;

(e) reading a car-radio sound volume signal $S_{VR}$ provided by a volume control provided in a car radio in said vehicle;

(f) setting a volume for said voice form message in response to the car-radio sound volume signal;

(g) outputting the determined voice form message according to the voice volume set therefor;

(h) determining whether or not a repeat switch is outputting a repeat switch signal R within a valid period for operability of the repeat switch;

(i) upon determining that the repeat switch is outputting the repeat switch signal within the valid period for operability thereof, repeating the step of reading the vehicle speed signals and the subsequent steps;

(j) upon determining that the repeat switch is not outputting the repeat signal during the valid period for operability thereof, terminating the process.

6. The method set forth in claim 5 wherein said step of determining whether or not the repeat switch is outputting the signal R within the valid period comprises the steps of:

(a) determining whether or not the valid period for operability of the repeat switch has expired;

(b) upon determining that the valid period has not expired, determining whether or not the repeat switch is outputting the repeat switch signal R:

and wherein said step of terminating the process comprises the steps of (c) upon determining that the repeat switch is not outputting the repeat switch signal, repeating the step of determining whether or not the valid period has expired, and the steps subsequent thereto; and (d) upon determining that the valid period has expired, terminating the process.

* * * * *